INVENTOR.
OMAR L. PATTERSON
BY
Busser, Smith & Harding
ATTORNEYS

July 31, 1962 O. L. PATTERSON 3,047,232

COMPUTING CIRCUITS

Original Filed Jan. 13, 1954 4 Sheets-Sheet 2

(5) $$E_0 = \frac{b_1 b_2}{E_3 + E_b} \cdot E_1 E_2$$

(6) $$E_1' = E_1 - \frac{E_b + K_1}{b_1}$$

(7) $$E_2' = E_2 - \frac{E_b + K_2}{b_2}$$

(8) $$E_0' = E_0 - E_b$$

INVENTOR.
OMAR L. PATTERSON
BY
Nussen, Smith & Hoxby[signature]
ATTORNEYS $$(9) \qquad E_0 = \frac{1}{K}(E_A + e_A)(E_B + e_B)$$

$$(10) \qquad E_P = E_0 - \frac{1}{K}(E_A e_B + E_B e_A + e_A e_B) = \frac{E_A E_B}{K}$$

INVENTOR.
OMAR L. PATTERSON
BY
[signature]
ATTORNEYS

INVENTOR.
OMAR L. PATTERSON
BY
[signature]
ATTORNEYS

United States Patent Office 3,047,232

Patented July 31, 1962

3,047,232
COMPUTING CIRCUITS

Omar L. Patterson, Media, Pa., assignor to Sun Oil Company, Philadelphia, Pa., a corporation of New Jersey Original application Jan. 13, 1954, Ser. No. 403,799. Divided and this application Sept. 16, 1957, Ser. No. 684,632

6 Claims. (Cl. 235—195)

This invention relates to computing circuits and, particularly, to circuits for the performance of multiplication and/or division.

This application is a division of my application Serial Number 403,799, filed January 13, 1954.

Since the process of multiplication is non-linear, it presents a very difficult problem in electrical computing apparatus where a high degree of accuracy and response time are required. Multiplication has been accomplished by electromechanical devices, carrier waveform systems, non-linear elements, multivariable tube characteristics, and various modulation systems. Electromechanical devices and carrier systems are capable of providing accuracies of the order of 0.1 percent but have poor response time. On the other hand, systems involving non-linear elements and characteristics are generally restricted to a range of 1 to 5 percent in accuracy but are capable of a high speed of response.

The present invention relates to circuits for the performance of multiplication and/or division which combine high accuracy and good frequency response. As will become clear hereafter, the invention relates to what might be referred to as parametric multiplication and division, involving the introduction of a dependent parameter which is mathematically eliminated from a pair of equations to secure multiplication and/or division.

The general object of the invention as well as detailed objects particularly relating to features of construction and operation will become apparent from the following description read in conjunction with the accompanying drawings, in which.

Figure 3:
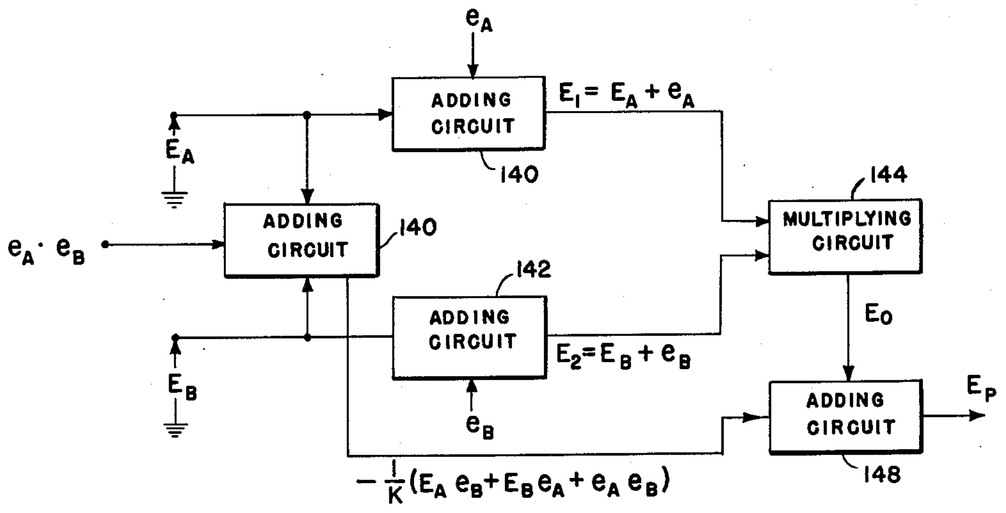
Figure 4:
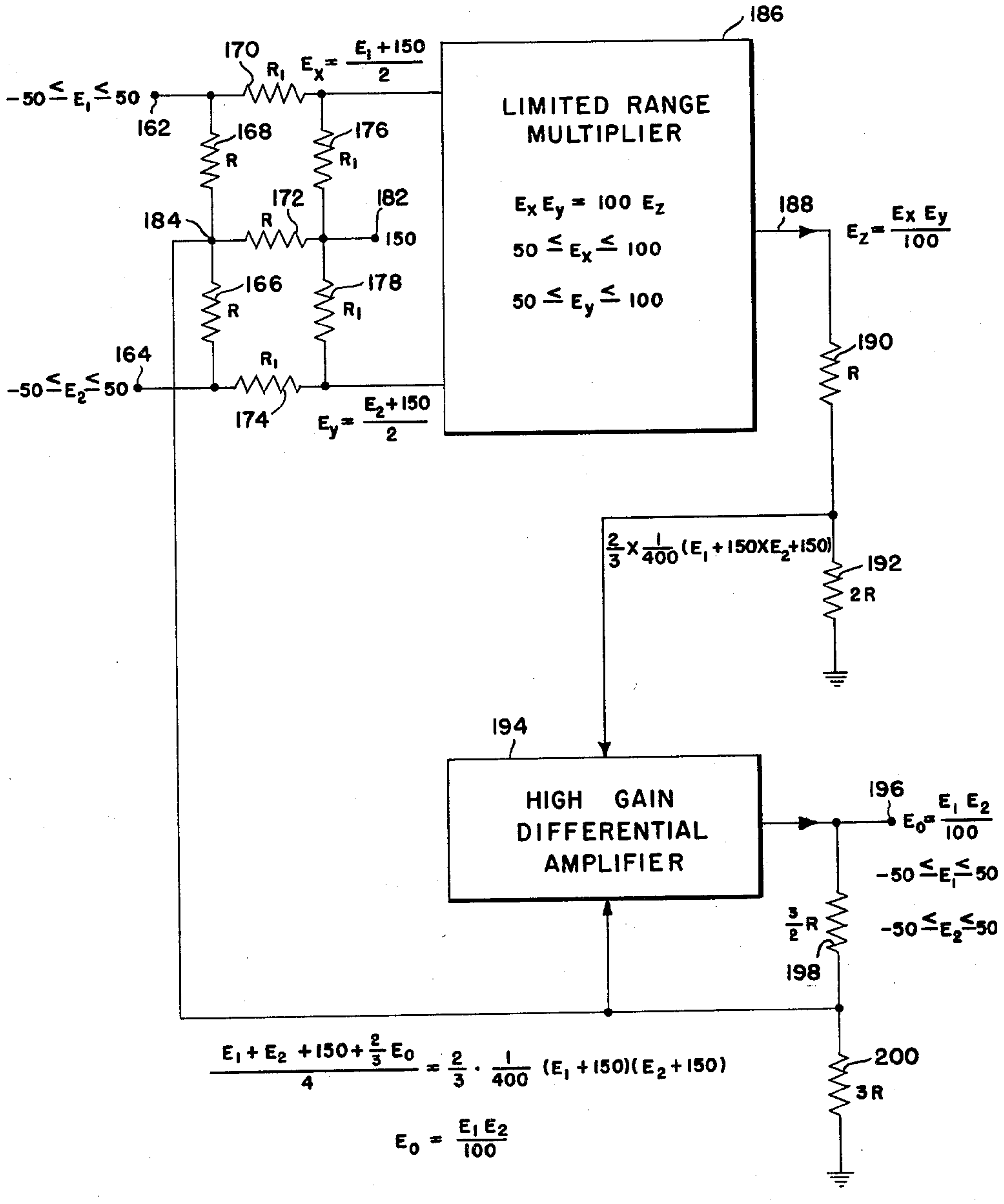

FIGURE 3 comprises a block diagram and various equations pertinent thereto, the diagram illustrating the fashion in which negative as well as positive quantities may be multiplied or divided; and FIGURE 4 is a diagram and various expressions pertinent thereto illustrating a further fashion in which negative as well as positive quantities may be multiplied.

Figure 1:
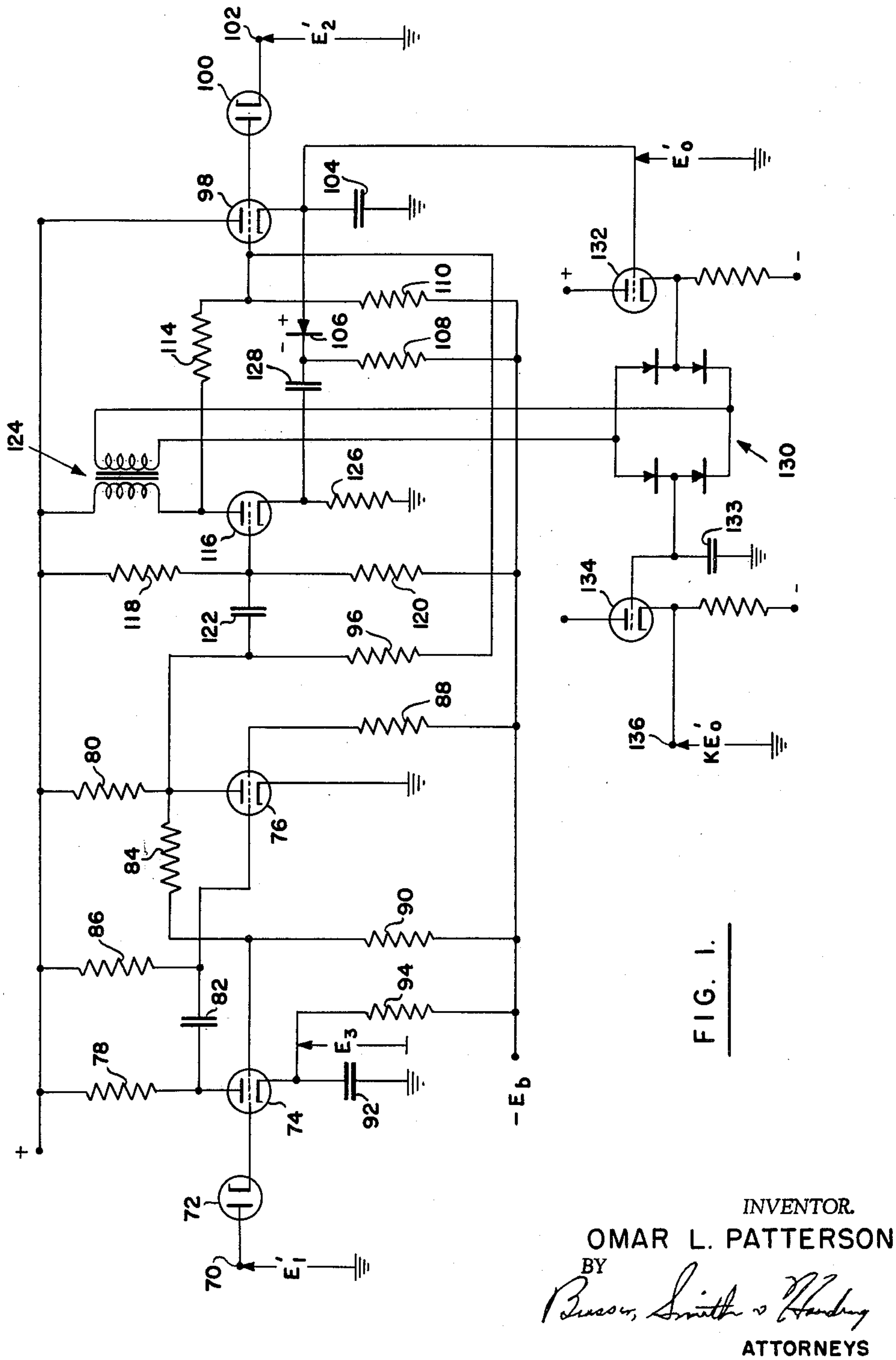
FIGURE 1 is a wiring diagram showing one embodiment of the invention.

Reference may now be made first to FIGURE 1 which shows a parametric time multiplying circuit in the form of a self-triggering multivibrator.

An input terminal 70 has applied thereto a potential $E_1'$ the nature of which will be hereafter described. The terminal 70 is connected to the anode of a diode 72 the cathode of which is connected to the grid of a triode 74 which is associated with a second triode 76 in a monostable multivibrator circuit involving the connections of the anodes of triodes 74 and 76 to a positive potential supply line through the respective resistances 78 and 80, the connection of the anode of triode 74 to the grid of triode 76 through the condenser 82, the connection of the anode of triode 76 to the grid of triode 74 through resistor 84, the connection of the grid of triode 76 to the positive potential supply line through resistor 86, and the connection of the grids of the triodes 76 and 74 to a negative potential supply line through the respective resistors 88 and 90. The potential of this negative supply line is indicated as $-E_b$. The cathode of triode 74 is connected to ground through condenser 92 and to the negative potential supply line through resistor 94.

The anode of triode 76 is connected through resistor 96 to the grid of a triode 98 which is also connected through the diode 100 to the terminal 102 at which there is applied the potential $E_2'$, the terminal 102 being connected to the cathode of the diode 100. A condenser 104 connects the cathode of triode 98 to ground. The cathode of triode 98 is connected through diode 106 and resistor 108 to the negative potential supply line. The anode of diode 106 is connected to the cathode of triode 98. The junction of the cathode of diode 106 and the resistor 108 is connected through condenser 128 to the cathode of a triode 116, the grid of which is connected to the positive potential supply line through resistor 118 and to the negative potential supply line through resistor 120. The anode of triode 76 is connected to the grid of triode 116 through condenser 122. The anode of triode 116 is connected to the positive potential supply line through the primary of a transformer 124. The cathode of triode 116 is connected to ground through resistor 126. The secondary of the transformer 124 is connected to the four diode switch as indicated at 130, this switch being connected at one side to the cathode of a triode 132 in a cathode follower arrangement, the grid of the triode 132 being connected to the cathode of triode 98. The other side of the switch is connected to the grid of a triode 134 which is in a cathode follower arrangement with an output from its cathode to the output terminal 136 at which there appears the potential $E_0'$.

Triode 76 is normally highly conducting due to a positive potential of its grid from the arrangement of resistors 86 and 88, but it may be assumed in describing the beginning of the operation that triode 76 has been cut off, with triode 74 highly conducting due to the high potential at the anode of triode 76 and the arrangement of resistors 80, 84 and 90. Under these conditions, the condenser 92 is charged to an initial maximum potential equal to that of the grid of triode 74 plus the bias potential between the cathode and grid. This fully charged potential of condenser 92 will be referred to as $E_3$. The diode 72 will be cut off because the potential $E_3$ is in excess of the potential $E_1'$.

The high positive potential of the anode of triode 76 at cut-off is applied through resistor 96 to the grid of triode 98 but limited to $E_2'$ by the diode 100. Accordingly, the condenser 104 is charged to a potential which is $E_2'$ plus the bias voltage of this triode plus the contact potential drop through diode 100. The initial potentials of the condensers 92 and 104 are, accordingly established.

Following the full charge of condenser 92 (and, simultaneously, condenser 104), the current through resistor 78 reaches a minimum value, cathode current flowing through resistor 94 only, and the condenser 82 charges through resistor 86 to a point at which triode 76 starts to conduct whereupon there occurs the usual regenerative action of a monostable multivibrator, triode 74 being sharply cut off and triode 76 being quickly rendered highly conductive. The drop of potential at the anode of triode 76 is applied to the grid of triode 98 which is also cut off.

Considering these last mentioned events as establishing zero time, the charged condensers 92 and 104 are both isolated from their charging circuits so that exponential decay of their potentials occurs. The time constant of the circuit of condenser 92 is the product of the resistance of resistor 94 and the capacity of condenser 92. The time constant of the circuit of condenser 104 is the product of the sum of the forward resistance of diode 106 and the resistance of resistor 108 multiplied by the capacity of condenser 104. (As will shortly appear, the cathode of triode 116 is now positive and quiescent so that the presence of condenser 128 does not enter into the matter of the time constant.)

Discharge of condenser 92 continues until the potential of its cathode drops sufficiently to restore conduction of triode 74. This condition occurs when the cathode potential drops to a point such that the grid is above cut-off potential relative to the cathode, the grid potential being maintained by the connection to terminal 70 through diode 72. Assume that this condition occurs at time $t_1$ indicated in FIGURE 4. At this same time, the potential of condenser 104 will have dropped to some value $E_0'$. The two exponential factors in the expressions for the potentials of condensers 92 and 104 are equal, giving rise to the elimination of the parametric exponential term and a product relationship which will be more fully discussed later.

Figure 2:
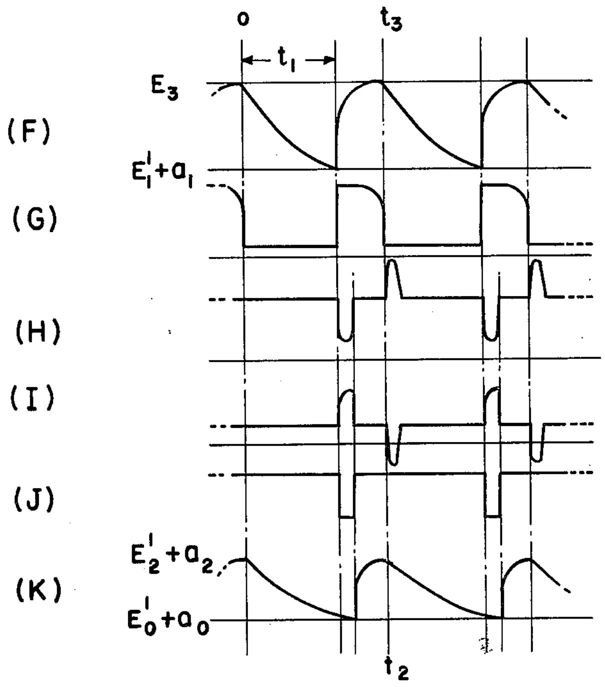
FIGURE 2 is a view explanatory of the operation of the circuit of FIGURE 1.

As indicated at F in FIGURE 2, the potential of condenser 92 will thus have dropped from the value $E_3$ to a value $E_1'$ plus $a_1$ in which $a_1$ merely represents a small potential. Similarly, as indicated at K in FIGURE 2, the potential of condenser 104 will have dropped from $E_2'$ plus $a_2$ to a value $E_0'$ plus $a_0$, in which $a_2$ and $a_0$ are also small constants.

Continuing the description of the operation, the initiation of current flow through triode 74 produces a negative application of potential through condenser 82 to the grid of triode 76 and a regenerative action occurs leading to sharp cut-off of triode 76 as indicated by the sharp rise in curve G in FIGURE 2 representing the potential at the anode of triode 76. This sharp rise of anode potential is differentiated by the arrangement of condenser 122 and resistors 118 and 120 and is applied as a positive pulse to the grid of triode 116 which is rendered highly conductive with the resulting appearance of a positive pulse at its cathode and a negative pulse at its anode. These pulses are indicated, respectively, at I and H in FIGURE 2. The positive pulse at the cathode cuts off diode 106 and, accordingly, terminates the discharge of condenser 104 at time $t_1$ as already indicated. The condenser 104, therefore, retains its potential $E_0'$ for the duration of the pulse, as indicated by the horizontal line at K of FIGURE 2, terminating at the time $t_2$. At the same time, the negative pulse at the anode of triode 116 insures cut-off of triode 98 despite the rise of potential at the anode of triode 76 which in the absence of the pulse from triode 116 would have rendered the triode 98 conductive. The potential of the condenser 104 is, accordingly, maintained constant during the interval between $t_1$ and $t_2$. Its potential is applied to the cathode follower involving the triode 132. Prior to time $t_1$ the four diode switch 130 was non-conducting due to the positive wave at the primary of transformer 124. At time $t_1$ the negative pulse at the anode of triode 116 produces a corresponding high amplitude pulse at the switch rendering it conductive and thereby connecting the cathode of triode 132 to the condenser 133 and the grid of triode 134. The condenser 133 is thus charged to the potential of the cathode of triode 132, current flow taking place in either direction through the switch to secure equality of these potentials.

The differentiated pulse appearing at the grid of triode 116 is of short duration, terminating at time $t_2$, and at this latter time the triode 116 again becomes non-conductive, removing the actuating pulse from the diode switch and isolating condenser 133 from the cathode of triode 132. The condenser 133 then holds the potential applied thereto and a proportional potential appears at the output terminal 136, this potential, as indicated in FIGURE 3, being proportional to the potential $E_0'$.

The resumption of cut-off condition of triode 116 restores the positive condition of its anode and the negative condition of its cathode. Diode 106, accordingly, is again rendered conductive (though this condition is of unimportance at this particular time), while triode 98 is rendered conductive, now under control of the continuing positive pulse at the anode of triode 76. At time $t_2$, therefore, recharging of condenser 104 occurs to the potential previously indicated related to the potential $E_2'$ at terminal 102. In the meanwhile, since time $t_1$, condenser 92 was charging. Circuit constants are so chosen that the condenser 104 will be fully charged before condenser 92, so that at time $t_3$ when the multivibrator returns to its stable state the circuit is restored to proper condition for a repetition of the cycle.

The multiplication effected by the circuit of FIGURE 1 does not involve direct multiplication of potentials appearing at terminals 70 and 102. There are several reasons for this. First, it may be noted that the condensers 92 and 104, if fully discharged, would have at their ungrounded terminals the potential $-E_b$. The return of the circuit to this negative potential line is chosen to avoid troubles in handling zero inputs. Such inputs pose a problem since exponential discharge would involve an infinite length of time for discharge to occur to zero. Furthermore, a return to the negative potential insures a high degree of linearity between the potentials of the cathodes of triodes 74 and 98 and the potentials of their respective grids. Secondly, there are involved cut-off and contact potentials in the triodes 74 and 98 and in the diodes 72 and 100. A complete analysis, which need not be undertaken here, reveals the following:

Assuming that it is desired to secure as $E_0$ the product of a pair of quantities (potentials) $E_1$ and $E_2$ as indicated in Equation 5 in FIGURE 2, the fraction being a constant, the potentials applied at $E_1'$ and $E_2'$ must be related to $E_1$ and $E_2$, respectively, as indicated in Equations 6 and 7. It will be noted that the applied and desired multiplied potentials are linearly related with additions of constants which involve the potential $E_b$ and constants designated $k_1$, $k_2$, $b_1$ and $b_2$. These latter constants embody tube characteristics, in particular cut-off and contact potentials, and, subject to drift, may be regarded as constants of the circuit to be determined by test multiplications. These constants may be added to $E_1$ and $E_2$ by conventional potentiometer and resistance arrangements of elementary type which need not be described. With the potentials $E_1'$ and $E_2'$ so arrived at applied to the terminals 70 and 102, there will be obtained the output at 136 proportional to $E_0'$ from which the value of the product $E_0$ may be derived by the addition of $E_b$ as indicated in Equation 8. There is thus obtained the desired product $E_0$ involving the proportionality constant which, as indicated in Equation 5, involves $b_1$, $b_2$, $E_3$ and $E_b$.

While $E_3$ has been indicated as resulting in the circuit of FIGURE 1 from the potential of the grid of triode 74 arising from the resistor arrangement 80, 84 and 90, it will be evident that $E_3$ may be arrived at independently by limiting the potential applied as a maximum to condenser 92, for example by connection of the cathode of triode 74 to a potential supply terminal through a diode having its positive terminal connected to the cathode of triode 74. Thus, division may be accomplished by a quantity which corresponds to the sum of $E_3$ and $E_b$.

The circuit of FIGURE 1 is particularly desirable because the maximum and minimum duration of the exponential discharge can be quite arbitrarily determined to provide the desired frequency response by suitable selection of circuit values and negative supply potential. For a given required accuracy, the upper limit of frequency response is determined by the rise and decay times of the positive pulse at the anode of triode 76. For a high speed of response, this triode may desirably be replaced by a pentode, the connections of which are conventional and obvious. Accuracy is primarily only affected by drift, which may be compensated by recalibration from time to time, and non-linearity between the grid and cathode of each of the triodes 74 and 98. However, these matters may be readily compensated for, and high accuracy with high speed of response is, therefore, readily attainable.

The use of the four diode switch at 130 permits rapid variation for both increasing and decreasing values of $E_0'$.

The circuit of FIGURE 1 involves the same limitation as other known multiplying circuits of being unable to multiply directly negative quantities to give proper signs of outputs. However, this difficulty is readily overcome in accordance with what is diagrammed in FIGURE 5, involving association with the multiplying circuit of various adding circuits.

Assuming that it is desired to multiply quantities represented by potential $E_A$ and $E_B$ which may have either positive or negative values, with the result of securing properly signed products, the potential $E_A$ is added in a conventional adding circuit 140 to a fixed positive potential $e_A$ which is of such magnitude that the sum will always be positive. The potential $E_B$ is likewise added in a circuit 142 to a fixed potential $e_B$ having the same property of producing a sum output which will always be positive. These two positive quantities are then introduced into the multiplying circuit 144 which may be of the type shown in FIGURE 1 or, in fact, of many other types. The product $E_0$ from the multiplying circuit will then have the form indicated in Equation 9 in which K is a constant. A further adding circuit 146 is provided which not only has the inputs $E_A$ and $E_B$ but an input corresponding to the product of $e_A$ and $e_B$. It should be noted that these last quantities are constants and, accordingly, this last introduction amounts only to the introduction of a fixed potential. In the adding circuit 146, by means of suitable resistances and potentiometers, the inputs are added to provide an output which is indicated in the diagram. It should here again be noted that $e_A$ and $e_B$ are merely constants and, therefore, represent mere proportions of the inputs $E_B$ and $E_A$. The output from the adding circuit 146 is fed to an adding circuit 148 where it is added to $E_0$ from the output of the multiplying circuit. The output of circuit 148 designated $E_P$ is as given in Equation 10 from which it will be noted that it is proportional to the product of $E_A$ and $E_B$. The adding circuits may be of any well-known types, the term "adding" being here used to include subtraction. For example, highly precise circuits of this type are disclosed in my application Serial No. 239,279, filed July 30, 1951. It will be evident that following this procedure the multiplication of negative quantities will result in products of proper sign.

Another circuit for extending the range of multiplication to that of negative quantities is illustrated in FIGURE 4 and involves the use of a high gain differential amplifier. In explanation of the operation there are indicated in FIGURE 4 potentials appearing at various points of the circuit, and for purposes of illustration it is assumed that the input potentials to be multiplied vary from minus 50 volts to plus 50 volts, the numerical values of potentials being given consistent with such range of operation.

The potentials to be multiplied are $E_1$ and $E_2$ applied to the respective terminals 162 and 164. These terminals are connected to an array of resistors 166, 168, 170, 172, 174, 176 and 178. The junction of resistors 176 and 178 is connected to a terminal 182 to which there is applied 150 volts. A limited range multiplier, i.e., one which will operate only on positive input potentials, is indicated at 186 and may be of the type previously described or other conventional types. Its inputs are provided, respectively, from the junction of resistors 170 and 176 and from the junction of resistors 174 and 178. Its output is delivered at 188 to the series arrangement of resistors 190 and 192 running to ground. A high gain differential amplifier has one input provided from the junction of resistors 190 and 192, and its other input from the terminal 184 at the junction of resistors 166 and 168. The output of the differential amplifier is to a terminal 196 and to the series arrangement of resistors 198 and 200 running to ground. The junction of these last resistors is connected to the same input as the terminal 184.

It will be noted that certain of the resistors mentioned have the same value R, while resistor 192 has a value 2R, resistor 198 has a value three-halves R and resistor 200 has a value 3R. Resistors 170, 176, 178 and 174 have equal values $R_1$ which need not be related to R.

By following the voltage legends at the various terminals and connections, the operation of the circuit will be apparent. At terminals 162 and 164 the applied potentials $E_1$ and $E_2$ may vary both positively and negatively. Through the introduction of the positive 150 volt potential at terminal 182, the inputs to the multiplier are made essentially positive. The output of the multiplier is also essentially positive. The high gain differential amplifier receives only positive potentials, but, since it operates between a high positive potential and a high negative potential, its output may be either positive or negative within the limits of operation. It will be noted that a scale factor of 100 is introduced in the value of the output potential $E_0$ so that the differential amplifier output varies within reasonable limits even though both of the inputs may be 50 volts.

What is claimed is:

1. Apparatus of the type described comprising a monostable multivibrator which includes a normally conducting tube and a normally nonconducting tube, a first time constant resistance-capacitance circuit connected to the cathode of the normally nonconducting tube, a first terminal receiving a potential from a first source and connected to a grid of said normally nonconducting tube through a diode of which the anode is connected to said first terminal and of which the cathode is connected to the grid, means providing an initial positive potential to said first time constant circuit during a period of conductivity of said normally nonconducting tube, a third tube, means for maintaining positive the anode of said third tube, a second time constant resistance-capacitance circuit connected to the cathode of said third tube, a second terminal receiving a potential from a second source and connected to a grid of said third tube through a diode of which the cathode is connected to said second terminal and of which the anode is connected to the grid, means effecting charging of said second time constant circuit during a period of conductivity of said normally nonconducting tube, means sampling the potential of said second time constant circuit at the time the potential of the first time constant circuit reaches a predetermined relationship to the potential of said first terminal during the stable state of said multivibrator, and means reestablishing at the last mentioned time the astable state of said multivibrator.

2. Apparatus according to claim 1 in which said sampling means includes a switch controlled by a transition of the states of said multivibrator.

3. Apparatus according to claim 1 in which said sampling means includes a four diode switch controlled by a transition of the states of said multivibrator.

4. Apparatus of the type described comprising a monostable multivibrator having a stable state and an unstable state, a first time constant resistance-capacitance circuit, a second time constant resistance-capacitance circuit, means controlled by said multivibrator for effecting charging of said time constant circuits to maximum potentials during the astable state of said multivibrator, means for effecting discharge of said time constant circuits during the stable state of said multivibrator, means responsive to the attainment by the first time constant circuit of a particular potential to effect shift of the multivibrator to its astable state and termination of discharge of said time constant circuits, and means for sampling the potential of said second time constant circuit existing at the time of termination of its discharge.

5. Apparatus according to claim 4 in which said sampling means includes a switch controlled by a transition of the states of said multivibrator.

6. Apparatus according to claim 4 in which said sampling means includes a four diode switch controlled by a transition of the states of said multivibrator.

References Cited in the file of this patent

UNITED STATES PATENTS 2,652,194 Hirsch ---------------- Sept. 15, 1953

OTHER REFERENCES

Proceedings of the IRE (Broomall et al.), May 1952, page 568–572.

Trans. of the IRE Prof. Group on Electronic Computers (Freeman et al.), March 1954, page 11–17.